US012748084B2

(12) United States Patent
Brewer et al.

(10) Patent No.: US 12,748,084 B2
(45) Date of Patent: Sep. 29, 2026

(54) CHROMATOGRAPHY DEVICES AND METHODS

(71) Applicant: DPX Technologies, LLC, Columbia, SC (US)

(72) Inventors: William E. Brewer, Columbia, SC (US); Matthew G. Fitts, Columbia, SC (US); Kaylee R. Mastrianni, Columbia, SC (US)

(73) Assignee: DPX TECHNOLOGIES, INC., Columbia, SC (US)

( * ) Notice: Subject to any disclaimer, the term of this patent is extended or adjusted under 35 U.S.C. 154(b) by 287 days.

(21) Appl. No.: 18/638,900

(22) Filed: Apr. 18, 2024

(65) Prior Publication Data

US 2024/0418684 A1 Dec. 19, 2024

Related U.S. Application Data

(60) Provisional application No. 63/508,093, filed on Jun. 14, 2023.

(51) Int. Cl.

| | |
|---|---|
| ***G01N 30/60*** | (2006.01) |
| ***G01N 30/32*** | (2006.01) |
| *G01N 30/02* | (2006.01) |

(52) U.S. Cl.

CPC ........... *G01N 30/603* (2013.01); *G01N 30/32* (2013.01); *G01N 30/6078* (2013.01); *G01N 2030/027* (2013.01)

(58) Field of Classification Search

None

See application file for complete search history.

(56) References Cited

U.S. PATENT DOCUMENTS

| | | | | |
|---|---|---|---|---|
| 5,762,877 | A | 6/1998 | Brewer | |
| 6,566,145 | B2 | 5/2003 | Brewer | |
| 9,084,994 | B2 * | 7/2015 | Oroskar | B01L 3/50255 |
| D782,693 | S | 3/2017 | Brewer et al. | |
| 9,733,169 | B2 | 8/2017 | Brewer | |
| 11,193,930 | B2 | 12/2021 | Brewer et al. | |
| 11,567,067 | B2 | 1/2023 | Brewer et al. | |

(Continued)

FOREIGN PATENT DOCUMENTS

| | | | |
|---|---|---|---|
| WO | 2011014357 | A1 | 2/2011 |
| WO | 2021046110 | A1 | 3/2021 |

OTHER PUBLICATIONS

Extended European Search Report for Application No. 24181853.3 dated Nov. 14, 2024.

*Primary Examiner* — Suman K Nath

(74) *Attorney, Agent, or Firm* — Boulware & Valoir PLLC

(57) ABSTRACT

A device for automated or manual separations of complex chemical or biological mixtures and methods of use are described. The device is a chromatography pipette tip or column having a size exclusion media therein and held in place by a hydrophilic filter at the distal end of the pipette tip and an optional removable or pierceable barrier at the proximal end of the pipette tip. The size exclusion media is wetted by simply placing the tip into solvent and allowing capillary action to flow through the filter and into the SEC resin. The solvent is then allowed to gravity drain from the pipette tip, allowing the size exclusion media to reproducibly pack into a homogenous gel. Separations can then be performed with the gelled size exclusion media.

19 Claims, 8 Drawing Sheets

(56) References Cited

U.S. PATENT DOCUMENTS

| | | | | |
|---|---|---|---|---|
| 2009/0223893 | A1 | 9/2009 | Gjerde et al. | |
| 2011/0042317 | A1 | 2/2011 | Gjerde et al. | |
| 2022/0088537 | A1 | 3/2022 | Brewer et al. | |
| 2022/0184525 | A1 | 6/2022 | Brewer et al. | |
| 2022/0184528 | A1* | 6/2022 | Williams ............... | B01D 15/22 |
| 2023/0075131 | A1 | 3/2023 | Brewer et al. | |

* cited by examiner

CHROMATOGRAPHY DEVICES AND METHODS

PRIOR RELATED APPLICATIONS

This application claims priority to U.S. Ser. No, 63/508,093, filed Jun. 14, 2023, and incorporated by reference in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates generally to the field of chemical and biological sample separations. Specifically, devices and methods for separations of complex biological or chemical mixtures via size exclusion chromatography ("SEC") or other chromatographic resins are described.

BACKGROUND OF THE DISCLOSURE

Chromatography is a laboratory technique for the separation of a mixture into its components. The mixture is dissolved in a fluid (gas or liquid) called the mobile phase, which carries it through a system (a column, a capillary tube, a plate, or a sheet) on which a material called the stationary phase is fixed. Because the different constituents of the mixture tend to have different affinities for the stationary phase and are retained for different lengths of time depending on their interactions with surface sites on the stationary phase, the constituents travel at different apparent velocities in the mobile fluid, allowing them to separate based on the differential partitioning between the mobile and the stationary phases.

Our interest herein lies in chromatographic columns, prepared with various chromatographic resins, such as size exclusion resins, affinity resins, ion exchange resins, silica, diatomaceous earth, alumina, and the like. Chromatographic columns are prepared by wetting a dry resin in buffer, then equilibrating the wet slurry in the buffer for a time sufficient to form a homogeneous gel-like material, followed by degassing. If the resin is prepared in bulk, it then must be carefully transferred to a column for use, without introducing air bubbles or channels that destroy the separation capability of a resin since the analytes can bypass the resin via bubbles or channels. However, these methods are time consuming and laborious, and there is a drive towards pre-prepared materials and automated methods.

Small columns pre-prepared with pre-wetted resin are now commercially available. For example, pipette tips containing size exclusion media are available from PhyNexus (San Jose, CA) and IMCS (Irmo, SC). These pipette tips act as the column and contain size exclusion media that is already swollen to a slurry and equilibrated. While an advance in technology, there are problems with these products. For instance, the packed slurry can be easily disrupted during shipping, resulting in air pockets and channeling. Thus, centrifugation prior to use is often needed. In addition, the original fluid and/or preservatives usually needs to be removed prior to use. The Phytips from PhyNexus (see US 20090223893), for example, use glycerol to maintain the wet bed and prevent adverse column function associated with a dried-out resin. However, this requires the user to remove glycerol prior to use. These extra requirements are time consuming steps that typically are performed by a technician and cannot easily be automated, plus the extra steps may introduce contamination issues.

Dry resin pipette tips are also commercially available from e.g., DPX Technologies (Columbia, SC) (see US20220184525). In these devices, a dry resin is packed inside the pipette tips, instead of being prewetted. The resin is swelled by the customer by simply aspirating the solvent (i.e., buffer) slowly into the pipette tips. While this method of swelling the resin is effective and reproducible, many robotic liquid handlers are unable to perform the steps of aspirating the solvent into the pipette tips and ejecting the tips to allow for equilibration because most systems require the pipetting head to dispense prior to ejecting the tip.

Thus, there still exists a need for improvements in the automation of chromatographic column preparation and analysis to remove as many human-dependent steps as possible. Even minor improvements that reduce the time needed to swell the size exclusion media and sample separation steps without sacrificing homogeneity of the gel will greatly improve laboratory throughput and success in separations. In addition, improvements to allow automated processing are needed.

SUMMARY OF THE DISCLOSURE

Disclosed herein is a novel device for chromatography, and methods of separation using the novel device. Specifically, the device is a pipette tip or column with a hydrophilic filter at the narrowest, distal-most end of the pipette tip, with a dry chromatography resin or media loosely contained inside the pipette tip. This is called a "chromatography pipette tip" herein. Methods of preparing the chromatography pipette tip for chromatographic use and separation uses of it are also described.

In more detail, a wide bore or regular pipette tip is preferably used as the column body to hold the resin. Alternatively, specially designed columns could be used, preferably sized to fit automated pipettors or robotic liquid handlers ("RLH"). However, pipette tips are preferred as readily available, inexpensive, suitable for separation uses, having small volumes, and already fitting the various pipetting aids.

The pipette tip is fitted with at least one hydrophilic filter at the distal (bottom) narrow end, which allows for the placement of a dry size exclusion media or other resin into the pipette tip above the filter. Ideally, there is very little or no dead space or dead volume below the filter, such that the hydrophilic filter will quickly contact and wick up any polar fluid that it is dipped into. The ideal dead volume is <50 μl, preferably <20 μl or even <2 μl, and most preferred is close to zero.

Because the chromatography pipette tip or column utilizes dry resin, it can be stored for longer periods of time before being used, as compared to devices having wet resin. While wet resin beds may dry out, or have channels and air bubbles formed over time (especially during shipping), the dry resin in the present devices are shelf-stable for long periods and storage does not affect its ability to be gelled at a later time.

Any chromatographic dry resin can be placed in the pipette tip, provided it too is hydrophilic and can be wet by the polar fluid. Resins include agarose- or sepharose-based resins, polyacrylamide, dextran, modified polystyrene, polyacrylate, cellulose, and other hydrophilic polymer materials or combinations thereof. One preferred resin is dextran crosslinked with epichlorohydrin.

One preferred resin type is a size exclusion resin. Commercially available size exclusion resins are numerous, and include the Superdex, Sephacryl, or Superose series of resins from GE Healthcare (Pittsburgh, PA): GE Sephadex S-200, GE Sephadex S-300, ToyoPearl HW-55F, and GE Superose 12 Prep. In some embodiments, soft gel resin particles, such as agarose- and sepharose-based beads, are preferred.

A size exclusion resin can have any molecular weight cutoff that is normally used in gel filtration chromatography, but is preferably in the range of 1000 Da to over 100,000 Da. In some embodiments, the chosen size exclusion media has a molecular weight cutoff range between 1000 Da and 10,000 Da, or between 50,000 Da and 100,000 Da, or between 20,000 Da and 70,000 Da. Alternatively, the molecular weight cutoff can be 700 Da, 1000 Da, 1500 Da, 2500 Da, 5,000 Da, 10,000 Da, 20,000 Da, 50,000 Da, 70,000 Da, or 100,000 Da. The person of ordinary skill in the art can easily select the appropriate range based on the analytes of interest and their contaminants.

Affinity resins that can be used in the present chromatography pipette tips, include any of the above resins conjugated to an antibody, a HIS tag, biotin, a chelator, a ligand, and the like. Numerous affinity resins are commercially available, and include Nuvia IMAC Resin, Profinity™ Epoxide Resin, Profinity IMAC Resin, Affi-Prep Protein A Resins, Affi-Gel® 10 and Affi-Gel® 15 Resins, Capto blue resin, Activated Thiol Sepharose 4B, and the like.

The resin could also be an ion exchange resin, most of which are made from a polystyrene polymer backbone and differ only by their specific functional groups. Two main types include cation exchange resins, that exchange positively charged ions, such as sodium for calcium, and anion exchange resins, that exchange negatively charged ions, such as chloride for hydroxide.

Other chromatography media that can be used in the invention includes silica, diatomaceous earth, and alumina.

The average particle diameters of the dry resin beads or particles used in the present device and methods are typically in the range of about 1 μm to several millimeters, e.g., diameters in ranges having lower limits of 10 μm, 20 μm, 30 μm, 40 μm, 50 μm, 60 μm, 70 μm, 80 μm, 90 μm, 100 μm, 150 μm, 200 μm, 300 μm, or 500 μm, and upper limits of 50 μm, 60 μm, 70 μm, 80 μm, 90 μm, 100 μm, 150 μm, 200 μm, 300 μm, 500 μm.

The amount of dry chromatography media can be between about 5 mg and about 500 mg of media, preferably in the range of about 50 to about 200 mg, and most preferably between about 70 and 150 mg. Alternatively, the amount of resin or media in the tip can be about a fourth to a third of the entire volume of the pipette tip.

The dry resin (or media) is loosely contained in the chromatography pipette tip or column, above the filter but below the hub. Alternatively, the resin is held in place between the filter and a pierceable barrier or removable barrier, located at or below the hub. The barrier serves as a means to seal the tip and securely contain the dry media resin during e.g., transportation and handling. The barrier or cap is not essential, however, and other means of preventing loss could be devised, such as a bulk container with close fitting lid.

The barrier may be a pierceable barrier of any type known in the art, including pierceable foil, film, membranes, or tape. In some embodiments, the material may be silicone rubber, soft rubber, neoprene, other suitable pierceable material(s), or a combination thereof. The pierceable barrier may also be made of a thin 3D printed plastic material. This allows the barrier to be pierced by an e.g., pipette tip, needle, or other means to break the seal before use. In other embodiments, the barrier or cap is removable by hand prior to use. In some embodiments, a user can remove each barrier as needed or can remove the barrier for a e.g., 96-piece tray of chromatography pipette tips at once. It is common for devices such as pipette tips to be packaged in the same sort of arrays found in microtiter plates, as the devices are frequently used together on RHL systems.

To swell the dry resin, the chromatography pipette tip or column is simply inserted into a container of polar fluid, such as an aqueous buffer, whereby the fluid level is lower than the top of the tip so that fluid enters only via the bottom end. There is no need to aspirate the solution into the tip because the hydrophilic filter will draw any polar solution into it. Instead, the pipette tip or column can be simply placed or ejected into the container of fluid. The fluid will migrate through the hydrophilic filter and permeate the resin via capillary action. As the liquid rises, the resin will swell rapidly and reproducibly, without any concerns for air bubbles or channels being created. Once the liquid has migrated to the top of the column, a small volume of additional fluid can be added to the top of the bed. This small and minimal volume of fluid ensures all of the resin is completely wetted and swollen. After a short time for gravity flow to allow this extra fluid to drain, the chromatography pipette tip is ready for sample loading.

There are many advantages of using this bottom loading of the resin. By loading the fluid using capillary action, no air can enter the resin, as the fluid gets absorbed and displaces the air from the tip or column "bottom up" and no bubble or channels are formed. Instead of requiring large volumes and hours (or days) for swelling, the resin is made in situ in mere minutes using bottom loading, and no transfers are then needed if prepared in the tip or column.

Although it is possible to use dry resin with a hydrophobic frit, as described in US20220184525, there are some major disadvantages for these products. Most liquid handling automation systems are incapable of aspirating liquid and then ejecting the pipette tips. These systems require the syringe barrels and plungers to be completely dispensed prior to ejection. This means that these liquid handlers cannot make the SEC tips with dry resin unless using capillary action. The second disadvantage is that the hydrophobic frits have a great resistance to flow of polar solvents, and this causes slower rates for swelling and equilibration. Not only does this make the methods longer, this resistance to flow may also cause irreproducible results.

Once the homogenous slurry is formed and equilibrated as needed to form homogenous gel-like material, the sample can be added to the top of the gel. The sample is gravity or positive pressure loaded thereinto, and the separation process can commence. Alternatively, the tip or column can be stored for later use by placing its distal end in a reservoir of the polar fluid to prevent drying. The storage container may be a screw cap vial, a rack with a lid that contains e.g., buffer in the bottom reservoir, or any device that will contain the tip or column and polar fluid and that can be capped to prevent evaporation.

The present devices and methods include any of the following embodiments in any combination(s) of one or more thereof:

A chromatography pipette tip, comprising: a pipette tip comprising a hollow tube with an open top end over a conical section and a bottom end that is smaller than said top end; said top end sized to fit over a separate pipette head; an exterior surface of said pipette tip above said conical section having an annular ridge or three or more vertical fins; a hydrophilic filter inside said pipette tip and a dry chromatography resin (or media) above said hydrophilic filter; said hydrophilic filter positioned at said bottom end of said pipette tip so as to have less than 50 µl dead volume inside said pipette tip and below said hydrophilic filter. Alternatively, the device may be a column as opposed to a pipette tip.

A method of preparing a chromatography pipette tip, comprising, a) inserting a chromatography pipette tip into a container of polar fluid, wherein said chromatography pipette tip is a pipette tip containing a hydrophilic filter and a dry chromatography resin (or media) above said hydrophilic filter, wherein said hydrophilic filter is positioned at a distal end of said pipette tip so as to have <50 µl dead volume below said hydrophilic filter;
b) wetting said hydrophilic filter by capillary action pulling said polar fluid upwards through said hydrophilic filter and into said dry chromatography resin to form swelled resin;
c) equilibrating said swelled resin in said polar fluid for a time sufficient to form a homogenous wetted resin (often called a gel);
d) optionally adding a small volume of said polar fluid to a top end of said chromatography pipette tip; and
e) draining any excess polar fluid out of said distal end of said chromatography pipette tip.

A method of chromatographic analyte separation, comprising:

a) inserting a chromatography pipette tip into a container of polar fluid, wherein said chromatography pipette tip is a pipette tip containing a hydrophilic filter and a dry chromatography resin (or media) above said hydrophilic filter, wherein said hydrophilic filter is positioned at a distal end of said pipette tip so as to have <5 0 µl dead volume below said hydrophilic filter;
b) wetting said hydrophilic filter by capillary action pulling said polar fluid up through said hydrophilic filter and into said dry chromatography resin to form a swelled resin;
c) equilibrating said swelled resin in said polar fluid for a time sufficient to form a homogenous swelled resin;
d) optionally adding a small volume of said polar fluid to a top end of said chromatography pipette tip; and
e) draining any excess polar fluid out of said distal end of said chromatography pipette tip;
f) adding a sample solution to said top end of said chromatography pipette tip, said sample solution containing two or more analytes;
g) allowing sample solution to load into said homogenous swelled resin;
h) optionally adding a wash solution (void volume) to said top end of said chromatography pipette tip, and allowing said wash solution to flow out said distal end;
i) adding an elution solution (collection fraction) to the top of said chromatography pipette tip and allowing said elution solution to flow out said distal end; and
j) collecting one or more elution fractions having separated analytes from sample matrix.

Any of the herein described devices or methods, wherein the filter is a hydrophilic screen, hydrophilic frit, or hydrophilic membrane. All that is needed is a hydrophilic material that is porous, yet strong enough to support the swelled resin material.

Any of the herein described devices or methods, wherein the hydrophilic filter is porous polymeric material, porous membrane, porous glass, sintered glass, or porous ceramic, screen, or mesh.

Any of the herein described devices or methods, wherein the dry chromatography resin is agarose, sepharose, polyacrylamide, dextran, polystyrene, polyacrylate, cellulose, or a combination thereof. Preferably, the resin comprises dextran crosslinked with epichlorohydrin.

Any of the herein described devices or methods, wherein the dry chromatography media is silica, diatomaceous earth, alumina, and the like.

Any of the herein described devices or methods, wherein the amount of the dry chromatography resin (or media) is between about 10 mg and about 500 mg. Alternatively, the amount of the resin is between about 140 mg and about 180 mg.

In another embodiment, ⅓-¼ the volume of the tip comprises dry resin (or media).

Any of the herein described devices or methods, wherein the average particle diameter of the dry chromatography resin is between about 10 µm and about 500 µm. Alternatively, the diameter is between about 100 µm and about 300 µm.

Any of the herein described devices or methods, wherein resin is a size exclusion resin, and the molecular weight cutoff is between about 700 Da to about 100,000 Da.

Any of the herein described devices or methods, wherein the barrier is removable or pierceable. The barrier can be removed or pierced prior to use, or just prior to loading sample onto the gel.

Any of the herein described devices or methods, wherein the barrier or cap is foil, film, membranes, tape, silicon rubber, soft rubber, plastic, or neoprene.

Any of the herein described methods, wherein the pipetting aid is a hand-held pipettor, a syringe, or a robotic liquid handler that directly attaches to the filtration pipette tip or indirectly attaches thereto through the use of an adaptor or top pipette tip.

Any of the herein described methods, wherein the polar fluid, sample solution, wash solution and/or elution solution individually are aqueous solutions, a mixture of aqueous and organic solutions, or organic solvents (like methanol or acetonitrile). Preferably, all fluids applied to the chromatography pipette tip are buffered aqueous fluids having a pH of 3-12, and most preferred about 6.5-7.5. Most preferred are phosphate buffered saline solutions. In addition, the polar fluid used for wetting the resin is ideally the same or similar to the sample solution that contains the analytes, and in some cases, such as SEC separation, the elution solution may also be the same. However, they may all be different, as needed for the separation being performed. At the very least, all solutions should be compatible for use with the analytes and with the chosen resin.

Any of the herein described methods, wherein adding an elution solution or wash solution or both are repeated 2-5 times. If the volume of sample solution is larger than the bed volume, it also may be added 2-5 times.

Any of the herein described methods, wherein all steps in the method are performed by a robotic liquid handling platform, or at least all addition steps. Alternatively, these steps may be performed using a handheld pipettor or a syringe attached to the chromatography pipette tip. Combinations of pipetting aids are also possible.

Any of the herein described methods, using the robotic liquid handling platform, wherein the robotic liquid handler picks up and moves a Tip-on-Tip (ToT) device having a top pipette tip and the chromatography pipette tip. In some embodiments, the robotic liquid handler moves the ToT device from a rack above a waste reservoir to a rack above one or more collection wells.

Any of the herein described methods, wherein the equilibrating step to swell the resin is between 1-15 minutes, preferably 1-10 minutes long, or even about 5 minutes or less.

Any of the herein described methods, wherein the loading, draining or flow steps is by gravity flow or by applying positive pressure.

Any of the herein described methods, further comprising the step of analyzing the separated analytes using enzymatic assay, immunoassay, affinity assay, refractive index detector, UV-Vis detector, viscometer, multi-angle light scattering detector, gel electrophoresis, mass spectrometer, or combinations thereof.

A kit comprising a plurality of chromatography pipette tips as herein described, preferably in a box having an array of holes for holding the tips.

A kit comprising a plurality of chromatography pipette tips as herein described and a syringe and/or an adaptor removably attached to each pipette tip (or in a separate array in the container) for aspirating and dispensing fluids through the one or more filtration pipette tips, wherein the syringe and adaptor are preferably sized to friction fit onto a barrel of the pipette head on a robotic liquid handler.

As used herein, "pipette tip" is a term of art well known in science and refers to a hollow tube with a larger top end, called the "hub" herein, over a conical section ending in a narrow end, called the "delivery end" herein, that is precisely engineered for accurate sampling and delivery of fluids. The hub fits over the barrel of the pipetting aid, typically by friction fit.

Most manufacturers of hand-held pipettors and robotic liquid handler systems make pipettors that use universal pipette tips, wherein both the pipette barrel and the hub have 1-2 degrees of taper for a friction fit between the parts. The interior diameter of the tip hub must be slightly larger than the barrel of the pipetting aid and the inside taper of the tip must also match the taper of the pipetting aid's barrel. The pipette tip thus fits over the barrel of the pipetting aid in an air-tight manner, such that when the plunger is pressed and released, a vacuum is applied, and fluid is pulled into the pipette tip. That fluid can be delivered to any receptacle by again pressing the plunger.

Some robotic pipette tips are not friction fitted, but use an expandable O-ring to make the air-tight seal required for liquid pipetting. Pipette tips for these systems need not have the tapered hub. Similarly, pipette tips can also fit onto the adaptor end of syringes and can form an air-tight seal through the use of a gasket or O-ring on the syringe. For a syringe, fluid is pulled into the pipette tip by pulling the syringe's plunger outward away from the syringe's body, and fluid is delivered by pushing the plunger inward into the syringe's body. As such, pipette tips are available in a range of sizes and/or styles to fit different pipetting aids.

Typically, a pipette tip has protrusions on an outer surface above the conical section that allow the tip to be stored on a platform or box having an array of holes into which the tips are inserted, the protrusions preventing the conical tip from sinking too far into the hole and getting stuck. Common protrusion styles include an annular ridge that completely circumnavigates the pipette tip, and a plurality of vertical fins, which provide strength, support the tip on the hole, and also minimize materials and weight. Combinations are also common.

The term "pipetting aid" as used herein refers to the various apparatus that are used to control fluid flow in and out of pipette tips, often by creating a vacuum. This includes hand-held or manual pipettors, pipettors (pipetting heads) on a robotic liquid handler, and syringes, which directly attach to the hub of the pipette tip to form an air-tight seal, or attach to adaptors or other means to indirectly attach the apparatus to the hub of the pipette tips.

As used herein, the term "top-pipette-tip" refers to a pipette tip having an O-ring or gasket on its outer surface for engaging with the inner surface of the hub of another pipette tip, wherein an air-tight seal forms between the two tips via the O-ring or gasket. In the present methods, a top pipette tip can be attached to a chromatography pipette tip for forming a tip-on-tip format. In the alternative, the two devices may be friction fit to provide an airtight seal, in the same way that pipette tips fit on a pipette barrel by adding a small amount of taper to the mated parts.

For example, U.S. Pat. No. 11,193,930 describes a Tip-on-Tip (ToT) format, wherein a "top" pipette tip performs some sample preparation steps before being attached, either reversibly or irreversibly, by fitting inside a second "bottom" pipette tip and forming an air-tight seal. The bottom tip has been modified to include a screen or frit, such that once attached, the sample solution is eluted from the top tip through the bottom pipette tip, which filters and cleans the solution, or using the tips herein, separates two or more analytes. In the presently described methods, a top tip can be directly attached to the 'bottom' chromatography pipette tip, and the robotic liquid handler will then be attached directly to the top tip, and indirectly attached to the chromatography pipette tip.

Alternatively, robotic liquid handlers may have adaptors that create distance between the pipetting head and the tip to reduce sample cross contamination on the pipetting head, or to aid in picking up and moving pipette tips around the RLH platform. In the presently described methods, the adaptor can be directly attached to the robotic liquid handler, and capable of engaging the hub of the chromatography pipette tip such that the RLH is indirectly attached to the chromatography pipette tip. Adaptors are also commercially available.

Therefore, when we describe a chromatography pipette tip fitting over the barrel of a pipettor, we intend to include both direct and indirect airtight connections.

A "robotic liquid handler" (RLH) is a robotic system, used for automation in chemical or biochemical laboratories that dispenses a selected quantity of reagent, samples or other liquid to a designated container. The simplest version can dispense an allotted volume of liquid from a motorized pipettor (pipetting head) or syringe. More complicated systems can also manipulate the position of the dispensers and containers (often a Cartesian coordinate robot) and/or integrate additional laboratory devices or add-ons, such as microplate readers, heat sealers, heater/shakers, bar code readers, spectrophotometric or separation devices and instruments, storage devices, waste containers and incubators. In addition to the motorized pipettor or syringe, robotic liquid handlers can also be a part of a robotic liquid handling platform that also have trays for sample wells or trays for holding sample vials, trays of pipette tips that fit the pipettor, and containers of solvents.

The methods described herein preferably use a robotic liquid handler capable of manipulating the position of pipette tips on the Cartesian, 3-axis movements, typically implemented by means of an arm, and having multi-pipetting capabilities. To further reduce human interaction, it is also desirable to have spectrophotometric instruments or mass spectrometers integrated with the handler.

Exemplary robotic liquid handlers include the Star or Starlet, Microlab VANTAGE or Nimbus from Hamilton Company; Bravo Automated Liquid Handling Platform from Agilent; the epMotion from Eppendorf; the Biomek 4000 or NX or FX from Beckman Coulter; the PIPETMAN from Gilson; the Freedom Evo from Tecan; and PAL systems from CTC or the MPS from GERSTEL, which are capable of being modified to perform pipetting and integrated with a variety of separation-mass spectrometric instruments. However, any commercially available robotic liquid handler can be used and/or modified to perform the disclosed separations.

As used herein, the term "filter" includes porous membranes, porous frits, and mesh or screens.

As used herein, the term "membrane" refers to a thin pliable film that acts as a porous barrier and serves to support the resin. In this application, the membrane will protect and contain the dry size exclusion media within the pipette tip during storage and transport. The membrane can be placed into the pipette tip during manufacturing using means known in the art.

As used herein, a "frit" is a sintered material that is solid but porous, and can serve as a filter and support for the resin. Preferably, a plastic frit is used, but ceramic, glass, or metal frits are also possible.

As used herein, "mesh" and "screen" are used interchangeably, and are woven or multiperforated flat sheets that can function as a filter and a support for the resin. These are often metal, but can also be polymeric or glass.

The terms "resin" and "media" are used interchangeably to refer to various chromatographic materials. The resin is dry and in the form of particles or beads during storage or transportation. When wetted and equilibrated it is sometimes called a gel. As used herein, the word "gel" is not intended to require that resin beads cross linked, but a swelled and equilibrated resin will have a homogenous appearance that appears gel-like. The use of the word gel distinguishes the dry resin from the fully prepared resin.

As used herein, the term "analyte" refers to the compounds that are being separated using the chromatographic resin. In some embodiments, the analytes can include biomolecules, particularly biological macromolecules such as proteins and peptides, polynucleotides such as DNA and RNA, lipids, and polysaccharides. Analytes may also include small molecules such as drugs and metabolites.

As used herein, "air-tight" is used to describe the seal between the pipettor head (or an adaptor attached thereto) and the hub of the pipette tip and/or the seal between the inner surface of the chromatography pipette tip and the outer surface of a top pipette tip or syringe head, and simply means that a vacuum may be drawn sufficient to load and unload fluids.

As used herein, the term "gasket" refers to a shaped piece of soft material used for sealing the junction between two surfaces. The gasket fills the space between two or more mating surfaces. Gaskets are normally made from rubber, silicone, metal, cork, neoprene, nitrile rubber, fiberglass, polytetrafluoroethylene (otherwise known as PTFE or Teflon), a plastic polymer (such as polychlorotrifluoroethylene) and other material that has some degree of yielding to allow for the deformation needed to fill the space between the two surfaces.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| GPC | gel permeation chromatography |
| IMAC | immobilized metal ion affinity chromatography |
| PBS | phosphate buffered saline |
| PCR | polymerase chain reaction |
| RLH | robotic liquid handling |
| SEC | size-exclusion chromatography |
| ToT | Tip-on-Tip format |
| THC | tetrahydrocannabinol |
| UV-Vis | Ultra violet-visible |

DETAILED DESCRIPTION

Figure 1A:
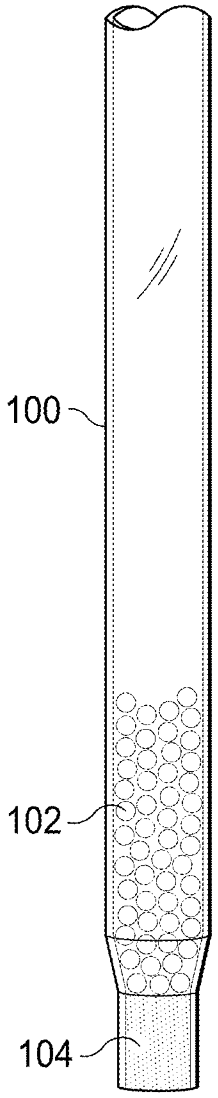
FIG. 1A-B display a chromatography pipette tip having 180 mg of Sephadex G15 resin before swelling (1A) and after swelling (1B).
Figure 1B:
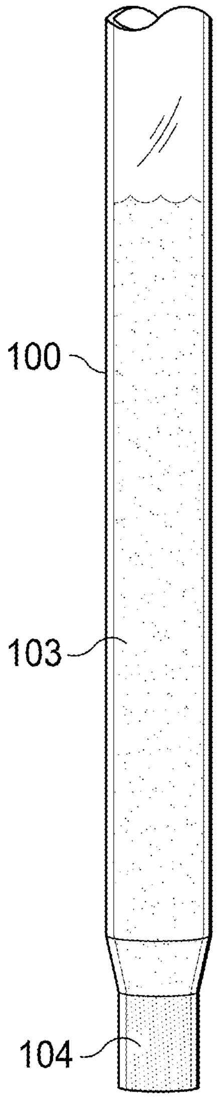
Figure 2C:
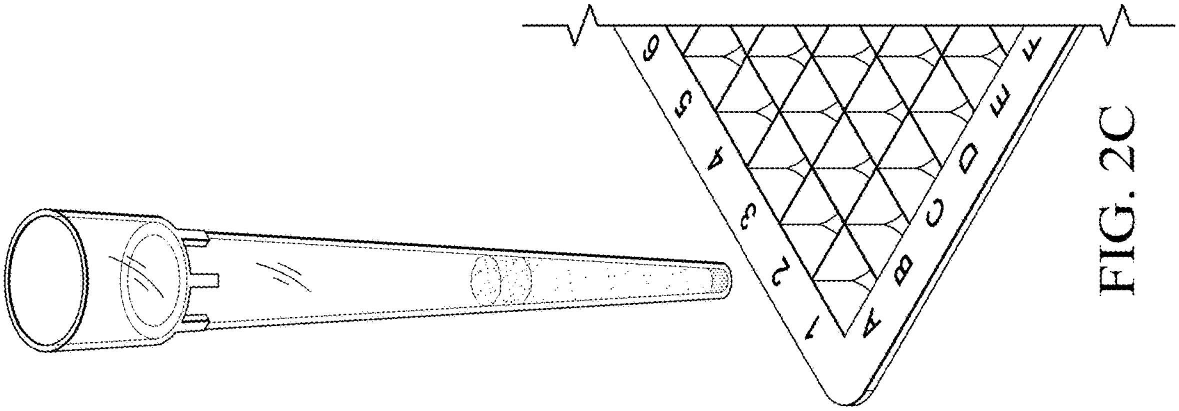
FIG. 2A-F display an embodiment of a chromatography pipette tip going through the method of swelling to form the gel, loading a sample solution, and separating compounds by size using e.g., size exclusion chromatography or "SEC."
Figure 2B:
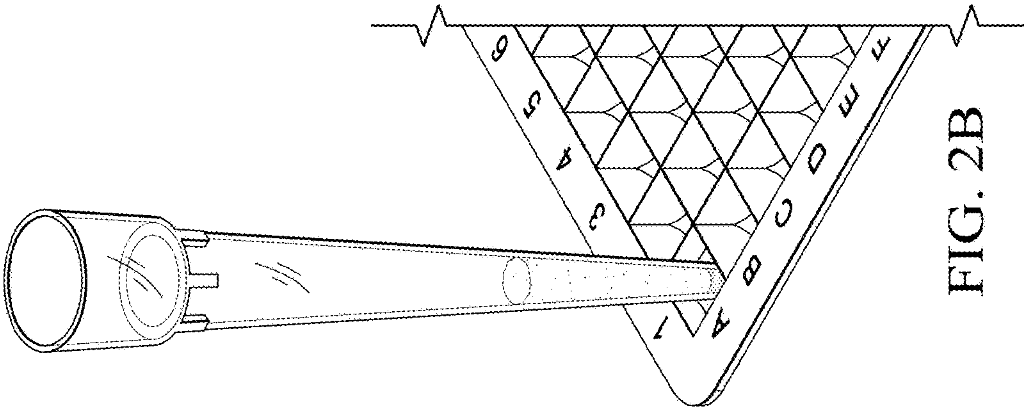
Figure 2A:
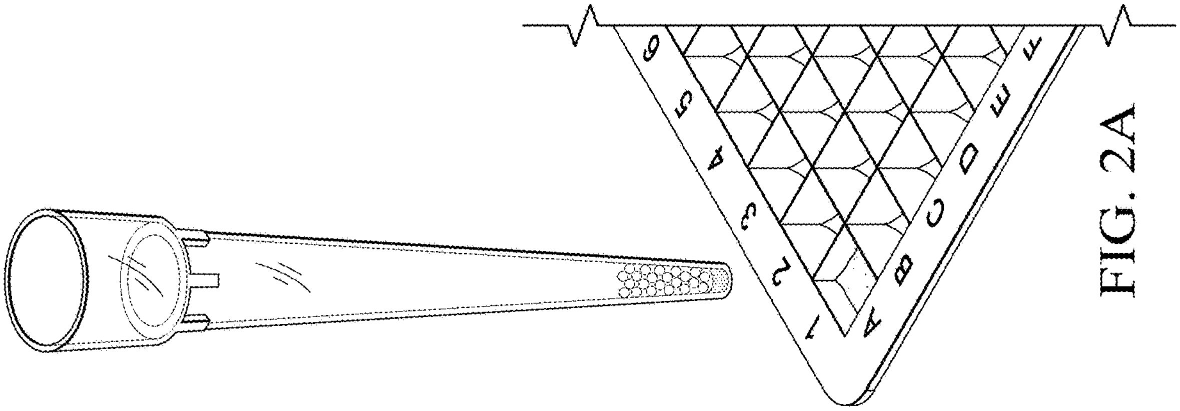
Figure 2F:
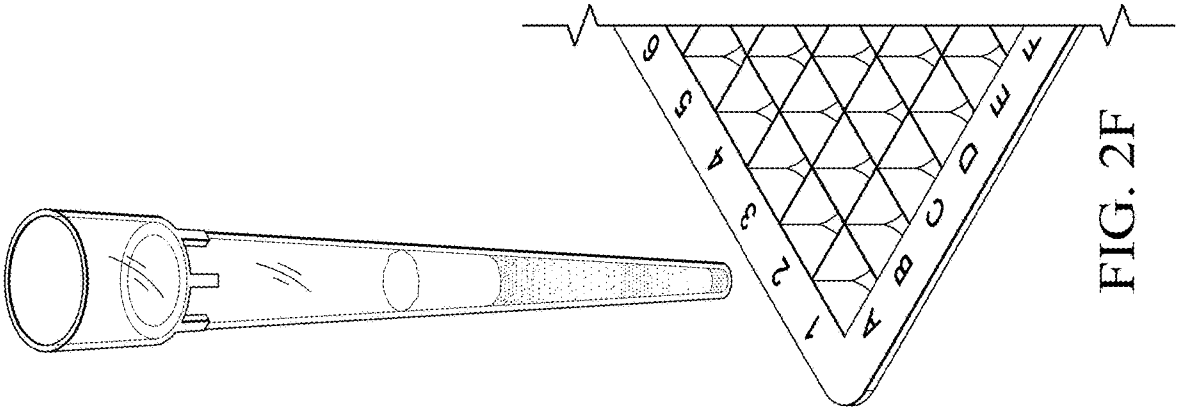
Figure 2E:
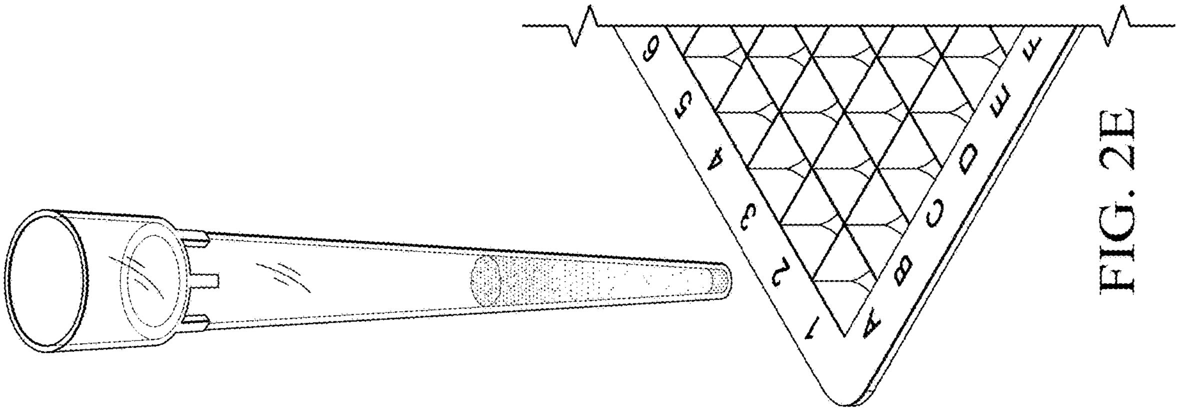
Figure 2D:
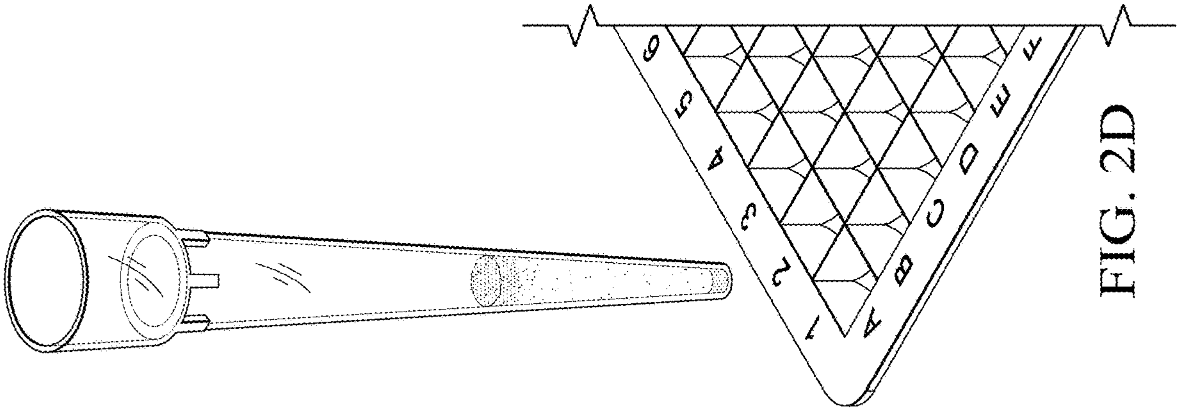

FIG. 1A displays a chromatography pipette tip 100 with dry resin (or media) 102 loosely contained therein, and FIG. 1B displays the same chromatography pipette tip 100 after the resin 103 has been prepared. A hydrophilic filter 104 located at the distal narrow end prevents loss of the resin 102 and facilitates the flow of fluid into the tip via capillary action.

In FIG. 2 we discuss particular examples of resins and filters, but these are exemplary only and the devices and methods are not so limited. FIG. 2A, the chromatography pipette tip contains a porous glass microfiber filter at the wide bore narrow end of the tip, and 70 mg of Sephadex G15 resin. FIG. 2B shows this tip placed inside of a well containing PBS buffer, and the resin was completely swelled in about 3 min via capillary action. FIG. 2C shows the tip with 50 μL of PBS buffer added to the top of the bed of gel. After allowing gravity drainage for this additional buffer, 75 μL of a green dye solution was added to the top of the chromatography pipette tip in FIG. 2D. After about 3 min of gravity flow, the sample was absorbed into the resin in FIG. 2E. Elution buffer was added to the top of the chromatography pipette tip, and after collecting about 100 μL of buffer, separation of blue dye (FD&C blue 1) from yellow dye (FD&C yellow 5) shown inside of the chromatography pipette tip in FIG. 2F. The 2 dyes were thus readily separated and collected into separate wells for further analysis.

The basic method of preparing the resin in the chromatography pipette tip for chromatography includes the steps of:

1) Placing the chromatography pipette tip into a container containing a polar fluid that is compatible with both the resin and the analytes to be separated. The level of fluid is lower than the height of the tip, so fluid may only enter via the delivery end;
2) Allowing the solvent to flow upwards into the chromatography pipette tip and fully wet and swell the resin;
3) Optionally adding a small volume of said polar fluid to the top of the chromatography pipette tip and allowing any excess to drain, thus producing a homogeneous gel-like 'column'.

Steps 2 and 3 may be performed in a predetermined amount of time, which depends on the type and amount of resin and also on the fluid used. For amounts less than 100 mg, the swelling is almost immediate after capillary action fills the bed, which takes less than about 5 min. It is recommended to add a small volume of buffer to the top of the bed to ensure the resin is completely wetted and swollen, but it is not essential and depends on the application. This additional amount is recommended to be about 50 μL or more, depending on the resin mass and composition, and only adds a couple of minutes to the overall equilibration time and gravity flow to make the chromatography pipette tip. It is also possible to control this flow using an attached pipettor or other positive pressure device.

The tip is then ready for sample loading once the excess fluid is drained.

Sample loading can be performed by adding the sample onto the top of the chromatography pipette tip. This step can be performed using either manual or robotic pipetting techniques.

The volume of sample loading is dependent on the dead volume of the resin 'column' inside the pipette tip. As shown in FIG. 1B, the 'column' of homogenous gel formed in the chromatography pipette tip is about 4.5 cm; however, it can be larger or smaller depending on the initial amount of dry chromatography resin and the size of the pipette tip being used. In some embodiments, the volume of sample loading will range between about 10 μL to about 500 μL, preferably in the range of 50 μL to 300 μL, or the range of 50 μL to 150 μL, or the range of 200 μL to 300 μL, or the range of 200 μL to 250 μL.

If too dilute the sample may first be concentrated, or the sample may be added to the tip in multiple doses to obtain complete loading.

Once the sample is fully loaded into the resin, the sample can be washed as needed, or otherwise treated, and then the analytes eluted. Wash and elution steps can be repeated 2 to 5 times as needed. As each target compound or analyte is eluted from the bottom of the chromatography pipette tip, it can be collected in one or more containers, such as wells, for further analysis.

The collected analytes can be analyzed by any method, including at least one of refractive index detector, UV-Vis detector, viscometer, multi-angle light scattering detector, gel electrophoresis and/or mass spectrometer, enzymatic assay, immunoassay, affinity assay, and the like. In some embodiments, a detector is used in tandem to analyze a sample.

Example 1

The separation capabilities of the presently described device was evaluated using size exclusion media with a low molecular weight cutoff of 1500 Da, using a hand-held pipettor as the pipetting aid. The sample solution contained a mixture of FD&C red 40 and red 3 dyes (small molecules with molecular weights of 496 and 880 g/mol, respectively), and a blue stained protein standard (molecular weights 10-250 kDa).

Figure 3:
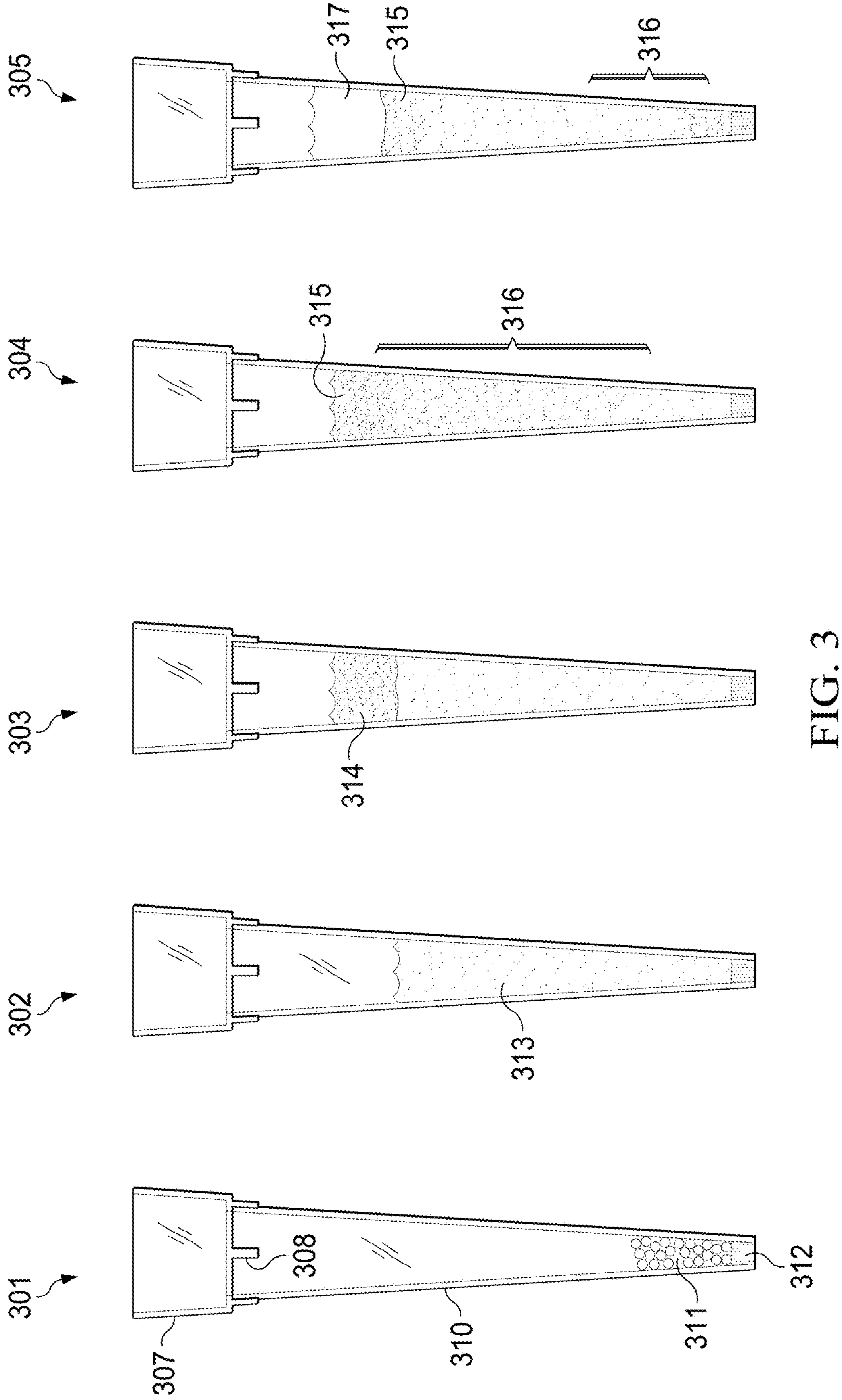
FIG. 3 illustrates the method of preparing and using a chromatography pipette tip for separation of target compounds in a sample.
Figure 4:
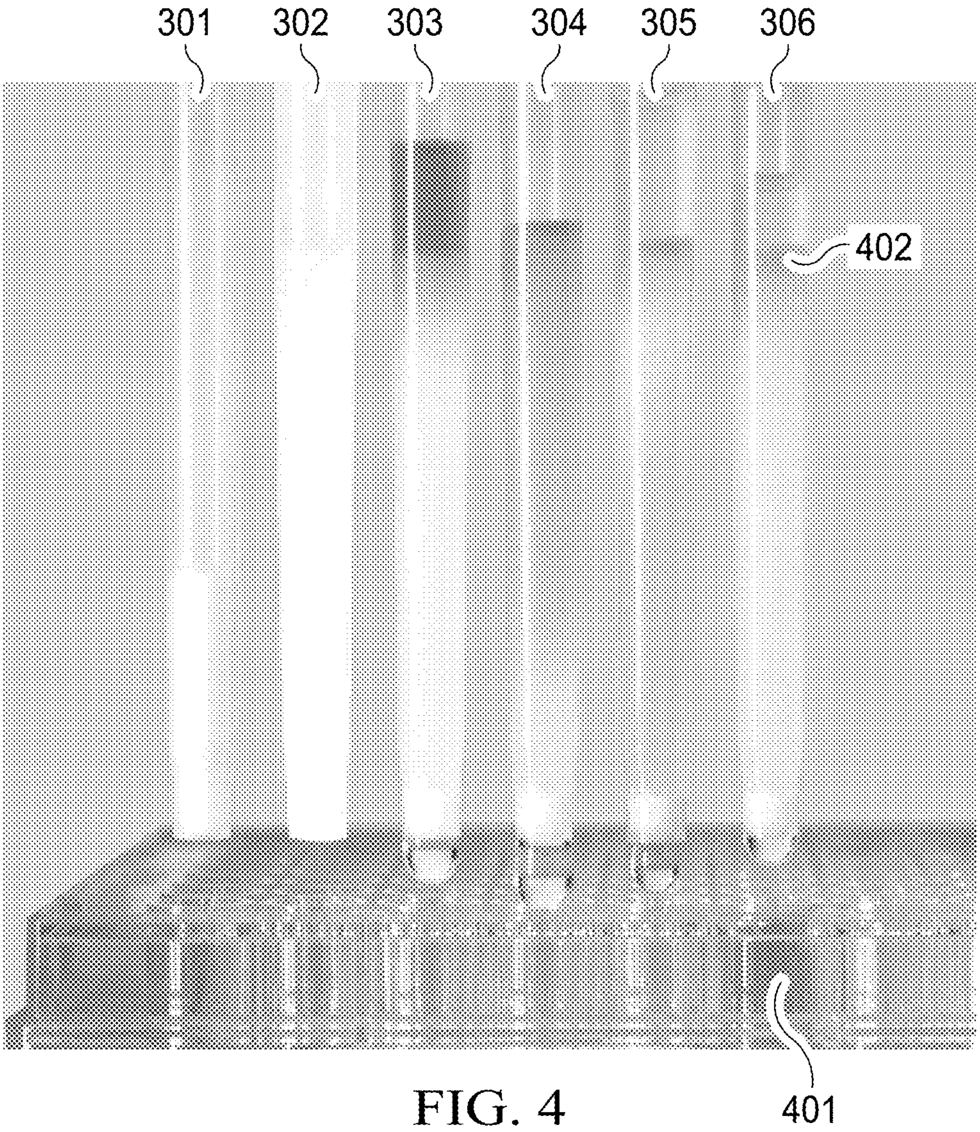
FIG. 4 is an image of a chromatography pipette tip at various points in the method illustrated in FIG. 3.

The process for preparing the chromatography pipette tip and performing the separation is illustrated in FIG. 3 and real images of the chromatography pipette tip at different points in this process are shown in FIG. 4. The sample wells and pipetting aids are omitted for simplicity.

The chromatography pipette tip 310 utilized Sephadex G15 resin 311 having a molecular weight cutoff of 1500 Da. About 180 mg of the Sephadex G15 resin was placed in a pipette tip having a porous hydrophilic frit (20 μm and made of polyethylene modified with surfactants) 312 at the distal, narrow end of the pipette tip, as shown in step 301. Annular ridge 307 at the exterior of the pipette tip and three vertical ridges 308 are also shown.

The frit is friction fitted into the narrow end of the tip, with the frit pressed to the bottom so that the frit is flush or near flush with the end of the pipette tip. We are reliably able to obtain a tip with less than 20 μl of dead volume using this method and this is low enough to readily allow wicking, but if a filter was placed over the tip (rather than inside) in a reliable leak proof manner, this could be reduced to zero. Use of a spherical filter or frit may also greatly reduce the dead space volume, and may be of simple manufacture.

The chromatography pipette tip was positioned into a well containing phosphate buffered saline (PBS) solution. In a matter of a few seconds, the buffer migrated up through the frit and was absorbed into the resin. The buffer continued to be absorbed into the resin via capillary action, and in a few minutes was completely absorbed and the resin swollen. A small volume of PBS was added to the top and allowed to gravity flow out, and this resulted in a homogenous gel-like resin 313 within the chromatography pipette tip, as shown in Step 302. It is also possible to use positive pressure from the pipettor to push the PBS solution through the wetted material and out of the pipette tip to form the final resin, however it is not necessary.

A volume of 0.2 mL of sample solution 314 was dispensed slowly onto the top of the size exclusion resin, and loaded into the gel using gravity flow, per step 303. The smaller red dyes 315 were retained by the size exclusion resin and remain at the top while the larger proteins 316 began to move through the column and separate from the red dyes, as shown in step 304. After loading the sample, the waste solvent reservoir was replaced with a sample vial. Then, 0.3 mL (300 μL) of the PBS solution 317 was added to the top of the resin, and passed through the resin using positive pressure from the handheld pipettor (not shown). The smaller red dyes were retained by the size exclusion resin and remained at the top of the column bed while the larger, blue stained proteins were able to exit the chromatography pipette tip and be collected in the sample vial as the target compounds eluted from the gel.

FIG. 4 displays photographs of the chromatography pipette tip at various points in this separation process, including step 306 collection of target compounds. The targeted compounds, blue stained proteins, are clearly visible in the sample vial 401, while the red dyes remain at the top 402.

Example 2

This example describes methods for using the chromatography pipette tip to remove proteins and collecting small drugs from a sample for chemical analysis by liquid chromatography with tandem mass spectrometry (LC/MS/MS). To 25 μL of urine (containing a drug mixture at 10 ng/mL), 25 μL of a commercial enzyme and buffer solution for hydrolyzing glucuronide conjugated drugs (B-glucuronidase) was added, along with 25 μL of water (to help minimize inhibitors). The solution was held at room temperature for 10 minutes to complete the hydrolysis step.

While hydrolysis was ongoing, a chromatography pipette tip containing 50 mg G-15 resin with a hydrophilic frit, was inserted into a well of PBS buffer and allowed to swell. After a couple of minutes, the PBS buffer flowed into the tip and the sorbent was swollen. Then 25 μL of PBS was added to the top and allowed to gravity drain. The wetted resin appeared completely homogenous and took less than 5 minutes to make.

The sample was added to the top of the chromatography pipette tip and allowed to gravity flow thereinto. Then 75 μL of PBS buffer (wash solution) was added and allowed to gravity flow through the tip for sample loading. Afterwards, 250 μL of 20% methanol in water (elution solution) was added to the top of the chromatography pipette tip and collected at the bottom via gravity flow, and this was analyzed as fraction 1. A second aliquot of 250 μL of 20% methanol was added to the top and collected via gravity flow, and this was analyzed as fraction 2.

Figure 5A:
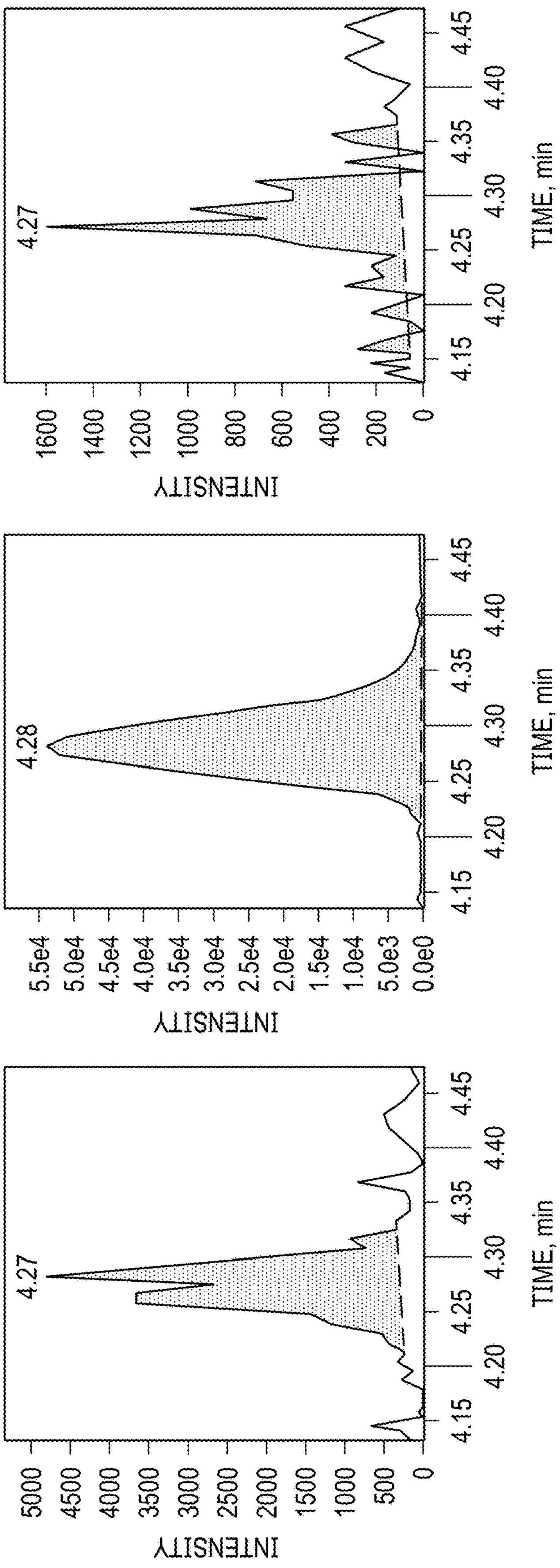
FIG. 5A-B show the chromatograms for fentanyl and carboxy-THC from the loading solvent in Example 2.
Figure 5B:
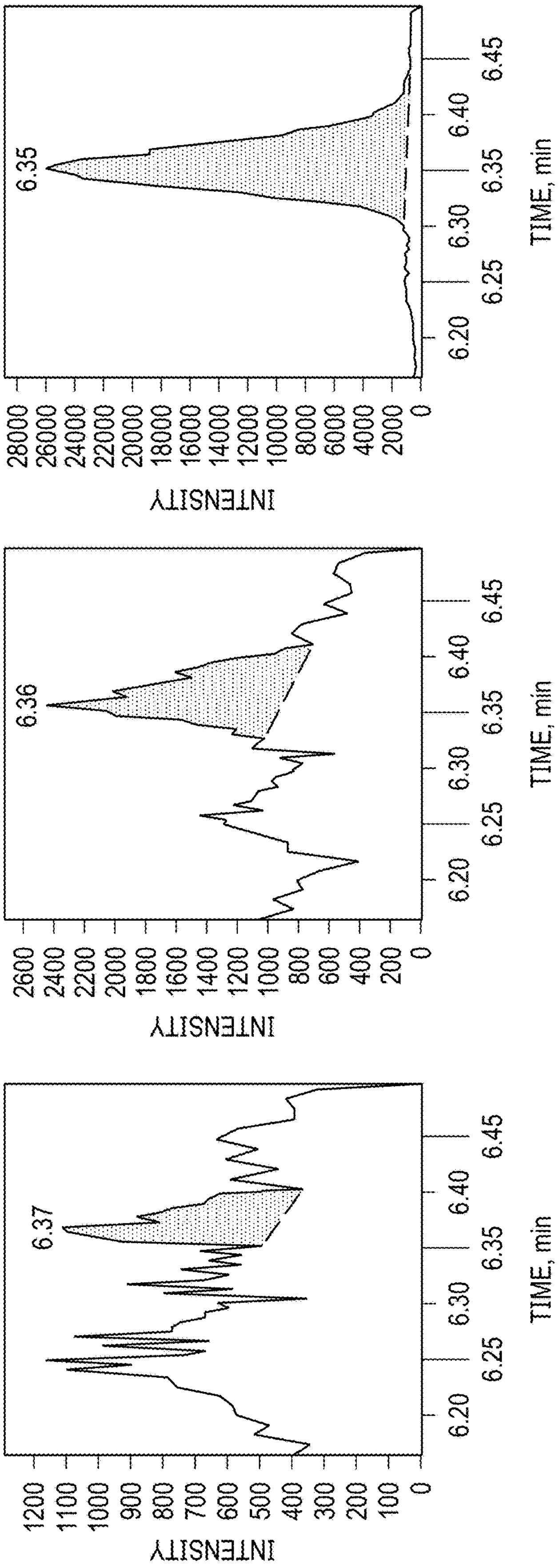

The loading buffer (wash solution) and the elution fractions were injected into a LC/MS/MS system for analysis. Negligible amounts of drugs were detected in the 75 μL of PBS loading buffer, but fraction 1 contained the majority of drugs (over 70% recovery of over 45 drugs of abuse were detected). The major metabolite of tetrahydrocannabinol (THC), carboxy-THC, was not detected in the fraction 1. Fraction 2, however, contained a large amount of carboxy-THC. FIGS. 5A and 5B show the chromatograms for fentanyl and carboxy-THC from the loading solvent, fraction 1 and fraction 2, respectively.

Example 3

The method of Example 2 was used herein, except the resin was replaced with 50 mg Sephadex G-10. Also, instead of elution with 20% methanol, elution was done using PBS buffer. The same protein and small molecule drug samples were used in this example.

A sample volume of 75 μL was added to the bed, and the well collected any excess PBS buffer as the sample loaded. A loading volume of 75 μL of PBS buffer was added to the wetted resin, and the gravity flow of fluid was collected into a second well. This represents the dead volume of compounds that are greater than the molecular weight cutoff (meaning these compounds would pass freely through the resin without partitioning into the pores). Then 3 subsequent aliquots of 75 μL of PBS buffer was added to the chromatography pipette tip and collected as fractions in wells 3, 4 and 5.

Figure 6:
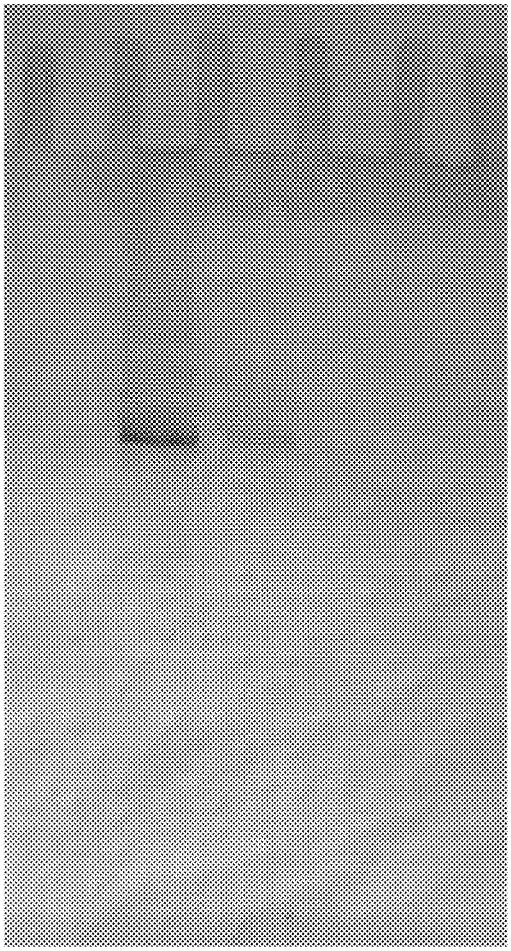
FIG. 6 Gel electrophoresis separation result for Example 3.

The 5 eluates were loaded onto a protein gel and separated by gel electrophoresis. The first lane, which should contain only PBS buffer as long as the dead volume of the column bed was at least 75 μL, did not contain any protein as shown in FIG. 6. The second lane was expected to contain protein since its molecular weight is much greater than 700 Da, the molecular weight cutoff of the G-10 resin. A dark blue band appeared in the protein gel for well 2, which shows the majority of protein passed through in this loading buffer.

The third well appeared to contain a very small amount of protein, which is barely noticeable in the gel. The fourth and fifth wells show no protein is present. The small drugs were found in wells 3 and subsequent fractions, and therefore the use of this chromatography pipette tip is suited for removing protein from samples being prepared for analysis of drugs and other small molecules.

While multiple embodiments and examples are disclosed herein, still other embodiments will become apparent to those skilled in the art from the above detailed description and drawings. As will be apparent, certain embodiments, as disclosed herein, are capable of modifications in various aspects, without departing from the spirit and scope of the claims as presented herein. Accordingly, the drawings and detailed description are to be regarded as illustrative in nature and not restrictive.

The following references are incorporated by reference in their entirety for all purposes.

US2002009809 U.S. Pat. No. 6,566,145 Disposable pipette extraction

US20090223893 Method and device for desalting an analyte.

US2015011016 U.S. Pat. No. 9,733,169 Dispersive Pipette Extraction Tip and Methods for Use US20200025755 U.S. Pat. No. 11,193,930 Automated protein precipitation and/or dispersive solid phase extraction using filter tips.

US20220184525 Automated group separations of complex mixtures with gel filtration pipette tips.

US2022088537 Membrane devices for filtration and extraction.

US20230075131 US2021373006 U.S. Pat. No. 11,567,067 Automated solid phase extraction using filter tips.

U.S. Pat. No. 5,762,877 Chemical sample concentrating device

U.S. Design 782,693 Dispersive insert for pipette tips.

The invention claimed is:

1. A method of preparing a chromatography column in a pipette tip, comprising:

a) inserting a chromatography pipette tip into a container of polar fluid, wherein said chromatography pipette tip contains a hydrophilic filter and a dry chromatography resin above said hydrophilic filter, wherein said hydrophilic filter is positioned at a distal end of said chromatography pipette tip so as to have <50 μl dead volume below said hydrophilic filter;

b) wetting said hydrophilic filter by capillary action pulling said polar fluid up through said hydrophilic filter and into said dry chromatography resin to form swelled resin;

c) equilibrating said swelled resin in said polar fluid for a time sufficient to form a homogenous wetted resin (gel);

d) optionally adding a small volume of said polar fluid to a top end of said chromatography pipette tip; and e) draining any excess polar fluid out of said distal end of said chromatography pipette tip.

2. The method of claim 1, wherein step d) is performed on a robotic liquid handling platform by a robotic liquid handler.

3. The method of claim 1, wherein said polar fluid is an aqueous buffer having a pH of 3-12 or said polar fluid is phosphate buffered saline.

4. The method of claim 1, wherein said hydrophilic filter is a porous plastic frit that has been modified with a surfactant, polysorbate, polyethylene glycol or polyvinyl alcohol or combinations thereof.

5. The method of claim 1, wherein said hydrophilic filter is a mesh screen, porous polymeric material, porous glass, porous membrane, glass microfibers, glass capillaries, or porous ceramic.

6. The method of claim 1, wherein said dry chromatography resin comprises agarose, sepharose, polyacrylamide, dextran, dextran crosslinked with epichlorohydrin, polystyrene, polyacrylate, cellulose, or a combination thereof.

7. The method of claim 1, wherein said draining step comprises gravity flow or by applying positive pressure to said top end of said chromatography column.

8. A method of chromatographic analyte separation, comprising:

a) inserting a chromatography pipette tip into a container of polar fluid, wherein said chromatography pipette tip is a pipette tip containing a hydrophilic filter and a dry chromatography resin above said hydrophilic filter, wherein said hydrophilic filter is positioned at a distal end of said pipette tip so as to have <10 μl dead volume below said hydrophilic filter;

b) wetting said hydrophilic filter by capillary action pulling said polar fluid up through said hydrophilic filter and into said dry chromatography resin to form a swelled resin;

c) equilibrating said swelled resin in said polar fluid for a time sufficient to form a homogenous wet resin (gel);

d) optionally adding a small volume of said polar fluid to a top end of said chromatography pipette tip;

e) draining any excess polar fluid out of said distal end of said chromatography pipette tip;

f) adding a sample solution in said polar fluid to the top end of said chromatography pipette tip, said sample solution containing two or more analytes;

g allowing said sample solution to load into said gel by gravity flow or by applying positive pressure;

h) optionally adding a wash solution (void volume) to the top end of said chromatography pipette tip, and allowing said wash solution to flow via gravity or positive pressure;

i) adding an elution solution (collection fraction) to the top end of said chromatography pipette tip; and j) collecting via gravity flow or positive pressure one or more elution fractions having separated analytes into one or more containers.

9. The method of claim 8, further comprising the step of analyzing said separated analytes using enzymatic assay, immunoassay, affinity assay, refractive index detector, UV-Vis detector, viscometer, multi-angle light scattering detector, gel electrophoresis, mass spectrometer and combination(s) thereof.

10. The method of claim 8, wherein a pipetting aid is used in adding steps d), f), h) and i) and wherein said pipetting aid is a hand-held pipettor, a syringe, or a robotic liquid handler that directly attaches to a top end of said chromatography pipette tip, or indirectly attaches thereto through the use of an adaptor or a top-pipette-tip.

11. The method of claim 10, wherein said pipetting aid is a robotic liquid handler and steps d) through j) are performed on a robotic liquid handling platform.

12. The method of claim 8, wherein said sample solution, said wash solution and said elution solution are buffered to a pH of 3-12.

13. The method of claim 8, wherein adding said elution solution step i) or adding said wash solution step h) or both are repeated 2 to 5 times.

14. The method of claim 8, wherein said hydrophilic filter is selected from a screen, porous frit, porous polymeric material, porous membrane, porous glass, sintered glass, glass microfibers, glass capillaries, or porous ceramic.

15. The method of claim 8, wherein said dry chromatography resin comprises agarose, sepharose, polyacrylamide, dextran, dextran crosslinked with epichlorohydrin, polystyrene, polyacrylate, cellulose, or a combination thereof.

16. A chromatography pipette tip, comprising:

a pipette tip comprising a hollow tube with an open top end over a conical section and a bottom end that is smaller than said top end;

said top end sized to fit over a separate pipette head;

an exterior surface of said pipette tip above said conical section having an annular ridge or three or more vertical fins;

a hydrophilic filter and a dry chromatography resin or media above said hydrophilic filter;

said hydrophilic filter positioned at said bottom end of said pipette tip so as to have less than 10 μl dead volume inside said pipette tip and below said hydrophilic filter; and a barrier at said top end to retain said dry chromatography resin.

17. The chromatography pipette tip of claim 16, wherein said hydrophilic filter is a porous plastic frit, a mesh screen, porous polymeric material, porous membrane, porous glass, glass microfibers, glass capillaries, or porous ceramic.

18. The chromatography pipette tip of claim 16, wherein said dry chromatography resin is a size exclusion resin comprising dextran crosslinked with epichlorohydrin.

19. A kit comprising a box with an array of holes therein, the chromatography pipette tip of claim 16 reversibly inserted into each hole of said array of holes, plus instructions for use of said chromatography pipette tip.

* * * * *